United States Patent
Nemoto et al.

(10) Patent No.: US 8,035,953 B2
(45) Date of Patent: Oct. 11, 2011

(54) SOLID ELECTROLYTIC CAPACITOR

(75) Inventors: Masaaki Nemoto, Ota (JP); Takashi Umemoto, Hirakata (JP); Hiroshi Nonoue, Hirakata (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 491 days.

(21) Appl. No.: 12/337,216

(22) Filed: Dec. 17, 2008

(65) Prior Publication Data

US 2009/0161299 A1 Jun. 25, 2009

(30) Foreign Application Priority Data

Dec. 21, 2007 (JP) ................................ 2007-329607

(51) Int. Cl.
*H01G 9/14* (2006.01)
*H01G 9/15* (2006.01)
*H01G 9/004* (2006.01)

(52) U.S. Cl. ........ 361/532; 361/523; 361/528; 29/25.03
(58) Field of Classification Search .................. 361/523, 361/532, 528; 29/25.03
See application file for complete search history.

(56) References Cited

U.S. PATENT DOCUMENTS

| | | | | |
|---|---|---|---|---|
| 3,293,507 A * | 12/1966 | Smith | ............................ | 361/518 |
| 3,466,508 A * | 9/1969 | Booe | ............................ | 361/536 |
| 3,828,227 A * | 8/1974 | Millard et al. | ................ | 361/540 |
| 3,970,903 A * | 7/1976 | Shirn | ............................ | 361/533 |
| 4,090,288 A * | 5/1978 | Thompson et al. | .......... | 29/25.03 |
| 4,203,194 A * | 5/1980 | McGrath | ..................... | 29/25.03 |
| 4,571,664 A * | 2/1986 | Hyland | ......................... | 361/540 |
| 4,660,127 A * | 4/1987 | Gunter | .......................... | 361/540 |
| 5,410,445 A * | 4/1995 | Kanetake | ...................... | 361/539 |
| 6,238,444 B1 * | 5/2001 | Cadwallader | ................ | 29/25.03 |
| 6,970,345 B2 * | 11/2005 | Oh et al. | ....................... | 361/540 |
| 7,443,653 B2 * | 10/2008 | Kim et al. | ..................... | 361/523 |
| 7,570,480 B2 * | 8/2009 | Kim et al. | ..................... | 361/540 |
| 2003/0218858 A1 * | 11/2003 | Kim et al. | ..................... | 361/523 |
| 2004/0066607 A1 * | 4/2004 | Edson et al. | .................. | 361/528 |
| 2005/0088805 A1 * | 4/2005 | Edson et al. | .................. | 361/529 |
| 2006/0260109 A1 * | 11/2006 | Vaisman et al. | ............. | 29/25.41 |
| 2006/0262489 A1 * | 11/2006 | Vaisman et al. | ............. | 361/540 |

(Continued)

FOREIGN PATENT DOCUMENTS

EP 1863044 A1 * 12/2007

(Continued)

OTHER PUBLICATIONS

English translation of JP/07-094,436. Translation downloaded from the JPO website on Jun. 17, 2011.*

*Primary Examiner* — Anatoly Vortman
(74) *Attorney, Agent, or Firm* — Marvin A. Motsenbocker; Mots Law, PLLC

(57) ABSTRACT

A solid electrolytic capacitor including an anode body, a dielectric layer arranged on the anode body, a conductive polymer layer arranged on the dielectric layer, and a cathode layer including a carbon layer arranged on the conductive polymer layer and a silver layer arranged on the carbon layer. The conductive polymer layer includes ridges and valleys formed in a surface that faces toward the cathode layer. The silver layer includes a first silver layer, which is arranged on the carbon layer, covers the ridges and valleys, and mainly contains spherical silver particles, and a second silver layer, which is arranged on the first silver layer and mainly contains silver flakes.

13 Claims, 1 Drawing Sheet

U.S. PATENT DOCUMENTS

| | | | |
|---|---|---|---|
| 2007/0177333 A1* | 8/2007 | Umemoto et al. | 361/502 |
| 2007/0279841 A1* | 12/2007 | Kim et al. | 361/540 |
| 2008/0019081 A1* | 1/2008 | Kim et al. | 361/535 |
| 2008/0062617 A1* | 3/2008 | Edson et al. | 361/529 |
| 2008/0080124 A1* | 4/2008 | Kim et al. | 361/529 |
| 2009/0154065 A1* | 6/2009 | Choi et al. | 361/523 |
| 2009/0154066 A1* | 6/2009 | Choi et al. | 361/523 |
| 2009/0154068 A1* | 6/2009 | Choi et al. | 361/533 |

FOREIGN PATENT DOCUMENTS

| | | |
|---|---|---|
| JP | 7-94368 A | 4/1995 |
| JP | 2004-79838 A | 3/2004 |

* cited by examiner

SOLID ELECTROLYTIC CAPACITOR

CROSS-REFERENCE TO RELATED APPLICATIONS

This application is based upon and claims the benefit of priority from prior Japanese Patent Application No. 2007-329607, filed on Dec. 21, 2007, the entire contents of which are incorporated herein by reference.

BACKGROUND OF THE INVENTION

The present invention relates to a solid electrolytic capacitor.

Solid electrolytic capacitors have superior high frequency characteristics and large capacities in addition to being compact. Thus, solid electrolytic capacitors are widely used in high frequency circuits of various types of electronic devices such as personal computers and imaging devices.

A typical method for manufacturing a solid electrolytic capacitor will now be discussed. First, powders of valve metals such as niobium (Nb) and tantalum (Ta) are pressurized and molded to form with an anode lead and then sintered to form a sintered body. The sintered body is then anodized to form a dielectric layer, which mainly includes oxides, on the surface of the sintered body. An electrolyte layer (e.g., conductive polymer layer of polypyrrole, polythiophene, and the like) is formed on the dielectric layer. A cathode layer (e.g., a laminated film of a conductive carbon layer and a silver paste layer) is formed on the electrolyte layer. In this manner, a capacitor element is obtained. The anode lead of the capacitor element is welded and connected to an anode terminal. The cathode layer of the capacitor element is connected to a cathode terminal by a conductive adhesive. Then, a transfer process is performed to mold and complete a solid electrolytic capacitor.

In the above-mentioned electronic device, the resistance components of solid electrolytic capacitors are required to be minimized. Research is being conducted to lower the equivalent series resistance (ESR) of a solid electrolytic capacitor (see e.g., Japanese Laid-Open Patent Publication No. 7-94368).

The '368 publication proposes mixing a powder, such as graphite powder, conductive polymer compound powder, or metal powder, to the conductive polymer layer of the solid electrolytic capacitor to form ridges and valleys in the surface of the conductive polymer layer. Such an irregular surface of the conductive polymer layer increases the mechanical adhesion force of the conductive polymer layer and the cathode layer (particularly, the conductive carbon layer in the cathode layer) and reduces the equivalent series resistance in a high frequency region.

SUMMARY OF THE INVENTION

The ridges and valleys on the surface of the conductive polymer layer formed by mixing powder, such as graphite powder, increases contact area in the interface between the conductive polymer layer and the conductive carbon layer. However, ridges and valleys reflecting the surface state of the conductive polymer layer are formed in the surface of the conductive carbon layer. The silver particles contained in the silver paste may not enter some of the valleys in the surface of the conductive carbon layer. In such a case, the effective contact area between the silver paste layer and the conductive carbon layer becomes small. This limits the reduction in the equivalent series resistance when forming ridges and valleys in the surface of the conductive polymer layer. In particular, when miniaturizing the solid electrolytic capacitor, ridges and valleys that are smaller in accordance with the extent of miniaturization are formed in the surface of the conductive polymer layer. This relatively increase the influence of the reduction in the effective contact area between the silver paste layer and the conductive carbon layer.

It is an object of the present invention to provide a solid electrolytic capacitor having a reduced equivalent series resistance.

One aspect of the present invention is a solid electrolytic capacitor including an anode body, a dielectric layer arranged on a surface of the anode body, a conductive polymer layer arranged on the dielectric layer, and a cathode layer including a carbon layer arranged on the conductive polymer layer and a silver layer arranged on the carbon layer. The conductive polymer layer includes ridges and valleys formed in a surface that faces toward the cathode layer. The silver layer includes a first silver layer, which is arranged on the carbon layer covering the ridges and valleys and mainly contains spherical silver particles. The silver layer further includes a second silver layer, which is arranged on the first silver layer and mainly contains silver flakes.

A further aspect of the present invention is a method for manufacturing a solid electrolytic capacitor. The method includes preparing an anode body, arranging a dielectric layer on a surface of the anode body, arranging a conductive polymer layer on the dielectric layer, arranging a carbon layer on the conductive polymer layer, and arranging a silver layer on the carbon layer. The arranging a conductive polymer layer includes forming ridges and valleys in a surface of the conductive polymer layer by performing a blasting process using abrasive grains having a predetermined grain diameter. The arranging a carbon layer includes covering the ridges and valleys of the conductive polymer layer with the carbon layer. The arranging a silver layer includes arranging a first silver layer mainly containing spherical silver particles on the carbon layer and arranging a second silver layer mainly containing silver flakes on the first silver layer.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
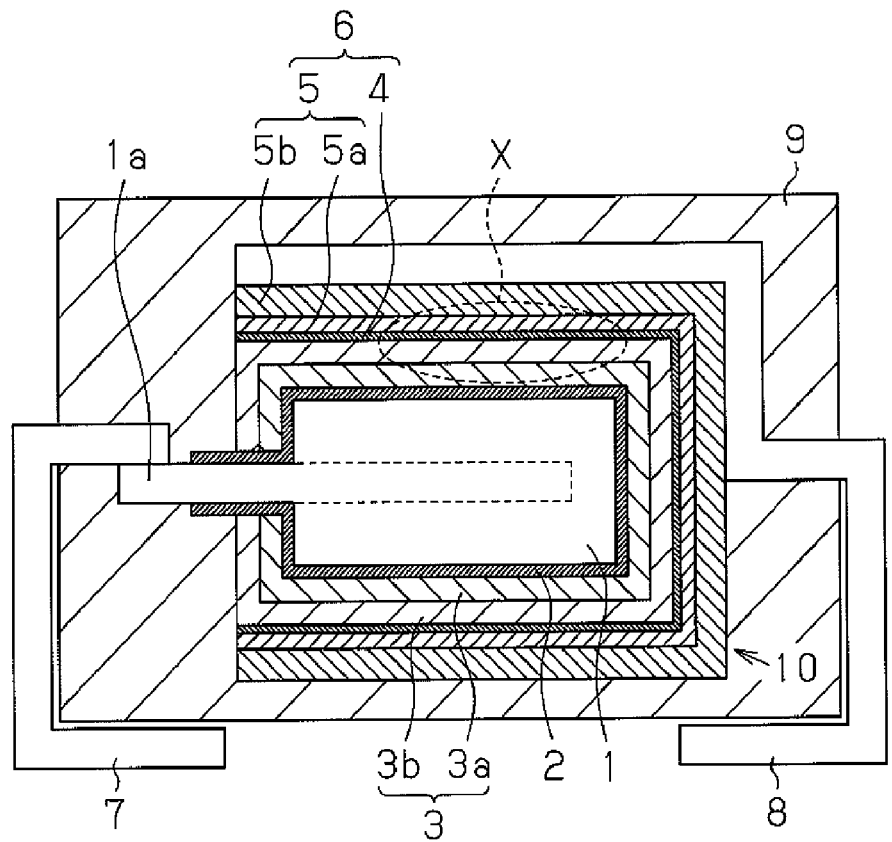
FIG. 1(A) is a schematic cross-sectional view of a solid electrolytic capacitor.
FIG. 1(B) is a partially enlarged view of region X in FIG. 1(A).
Figure 1:
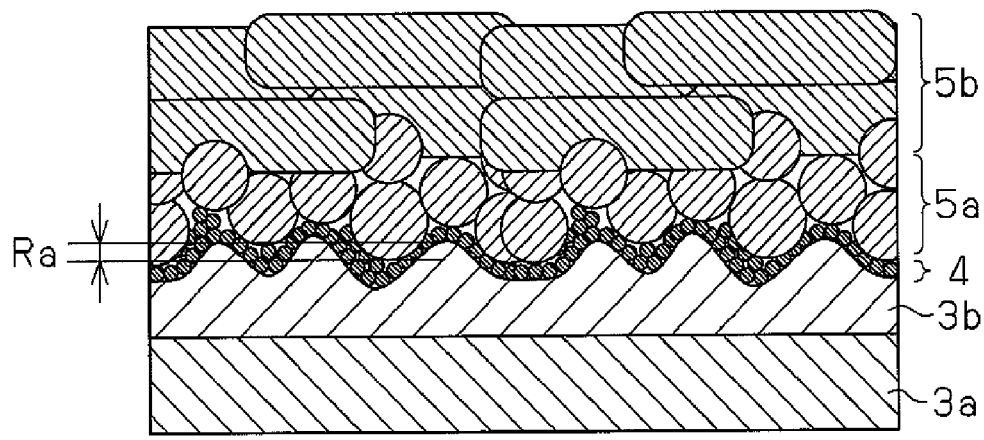

A preferred embodiment of the present invention will now be discussed. The preferred embodiment does not limit the scope of the present invention.

A structure of the solid electrolytic capacitor in the preferred embodiment will now be discussed with reference to FIGS. 1(A) and 1(B).

The solid electrolytic capacitor includes a capacitor element 10. The capacitor element 10 includes an anode body 1, an anode lead 1a extending out of the anode body 1, a dielectric layer 2 formed on a surface of the anode body 1, a conductive polymer layer 3 formed on the dielectric layer 2, a conductive carbon layer 4 formed on the conductive polymer layer 3, and a silver paste layer 5 arranged on the conductive carbon layer 4. The conductive carbon layer 4 and the silver paste layer 5 function as a cathode layer 6.

As shown in FIG. 1(B), the conductive polymer layer 3 has an outermost surface that includes ridges and valleys, or a protrusion-and-recess patterned surface. The ridges and valleys on the outermost surface are covered by the conductive carbon layer 4.

As shown in FIG. 1(B), the silver paste layer 5 includes a first silver paste layer 5a and a second silver paste layer 5b, which is arranged on the first silver paste layer 5a. The first silver paste layer 5a mainly contains spherical silver particles. The second silver paste layer 5b mainly contains silver flakes, or plate-shaped silver particles.

A plate-shaped cathode terminal 8 is bonded to an outer surface of the cathode layer 6 by a conductive adhesive (not shown). A plate-shaped anode terminal 7 is bonded to the anode lead 1a. The anode terminal 7 and the cathode terminal 8 partially extend out of a mold package 9, which is formed from an epoxy resin or the like, as shown in FIG. 1(A).

The structure of the solid electrolytic capacitor will now be discussed in detail.

The anode body 1 is a porous sintered body formed from valve metal particles. The anode lead 1a is a rod-shaped lead formed from the same valve metal as the anode body 1. The anode lead 1a has a distal portion projecting out of the anode body 1 and a basal portion embedded in the anode body 1. The valve metal for forming the anode lead 1a and the anode body 1 is a metal material enabling the formation of an insulative oxide film, and may be a simple substance of a metal such as niobium (Nb), tantalum (Ta), aluminum (Al), or titanium (Ti). An alloy of two or more of these valve metals may also be used. The valve metal forming the anode body 1 may differ from the valve metal forming the anode lead 1a.

The dielectric layer 2 is a dielectric formed from oxides of the valve metal and has a predetermined thickness on the surface of the anode body 1. If the valve metal includes niobium metal, the dielectric layer 2 is formed from niobium oxides.

The conductive polymer layer 3, which functions as an electrolyte layer, is arranged on the surface of the dielectric layer 2. The conductive polymer layer 3 is a laminated film including a pre-coat layer (not shown) formed on the surface of the dielectric layer 2 through chemical polymerization, a first conductive polymer layer 3a formed on the pre-coat layer through electrolytic polymerization, and a second conductive polymer layer 3b formed on the first conductive polymer layer 3a through electrolytic polymerization. The outermost surface of the second conductive polymer layer 3b, that is, the surface that contacts the cathode layer 6 (conductive carbon layer 4) includes ridges and valleys formed through a blasting process. The first conductive polymer layer 3a mainly functions as an electrolyte layer, and the second conductive polymer layer 3b mainly functions as a protective layer for the first conductive polymer layer 3a.

The conductive polymer layer 3 (pre-coat layer, first conductive polymer layer 3a, and second conductive polymer layer 3b) is formed from a material having superior conductivity such, as polypyrrole, polythiophene, polyaniline, polyflan, and the derivatives of these substances. However, the material of the conductive polymer layer 3 is not particularly limited as long as a polymer material having conductivity is used. Further, the plural layers in the conductive polymer layer 3 may be formed from the same material or from different materials.

The cathode layer 6 is a laminated film of the conductive carbon layer 4, which contains spherical carbon particles, and the silver paste layer 5, which contains silver particles. The silver paste layer 5 has a laminated structure in which the first silver paste layer 5a mainly containing spherical silver particles and the second silver paste layer 5b mainly containing silver flakes (plate-shaped silver particles) are formed in order. The conductive carbon layer 4 is adhered to the ridges and valleys on the outermost surface of the conductive polymer layer 3. The outermost surface of the conductive carbon layer 4, that is, the surface facing toward the silver paste layer 5 has ridges and valleys formed in correspondence with the ridges and valleys on the outermost surface of the conductive polymer layer 3. The silver paste layer 5 is formed on the outermost surface of the conductive carbon layer 4. The silver flakes have higher conductivity than the spherical silver particles. Thus, the silver flakes are effective in reducing the resistance of the entire silver paste layer 5.

The capacitor element 10 includes the anode body 1, out of which the anode lead 1a extends, the dielectric layer 2, the conductive polymer layer 3, and the cathode layer 6 (conductive carbon layer 4 and silver paste layer 5).

The anode terminal 7 and the cathode terminal 8 function as external lead terminals of the solid electrolytic capacitor. The anode terminal 7 and the cathode terminal 8 are flat plates made of a conductive material, such as copper (Cu) or nickel (Ni). The anode terminal 7 is spot-welded and bonded to the anode lead 1a. The cathode terminal 8 is bonded to the cathode layer 6 by a conductive adhesive (not shown).

The anode terminal 7 and the cathode terminal 8 partially extend out of the capacitor element 10 in opposite directions. In this state, the mold package 9, which is formed from an epoxy resin, is molded onto the capacitor element 10. The distal portion of the anode terminal 7 and the distal portion of the cathode terminal 8 exposed from the mold package 9 function as terminals when connecting (soldering) the solid electrolytic capacitor to a substrate such as a printed circuit board. The distal portion of the anode terminal 7 and the distal portion of the cathode terminal 8 may be bent along the outer surface of the mold package 9 to the lower surface of the mold package 9.

The anode body 1 serves as the "anode" of the present invention. The dielectric layer 2 serves as the "dielectric layer" of the present invention. The conductive polymer layer 3 serves as the "conductive polymer layer" of the present invention. The conductive carbon layer 4 serves as the "carbon layer" of the present invention. The silver paste layer 5 serves as the "silver layer" of the present invention. The first silver paste layer 5a serves as the "first silver layer" of the present invention. The second silver paste layer 5b serves as the "second silver layer" of the present invention. The cathode layer 6 serves as the "cathode layer" of the present invention.

[Manufacturing Method]

As an example, a method for manufacturing the solid electrolytic capacitor of FIG. 1 will now be discussed.

Step 1: Part (e.g., basal end) of the anode lead 1a is embedded in a green body, which is formed from particles of valve metal. The green body is then sintered in a vacuum environment to form the anode body 1, which is a porous sintered body. The valve metal particles are fused together by the sintering. Gaps formed between the valve metal particles are reduced in size by the sintering.

Step 2: The anode body 1 undergoes anodization in a phosphoric acid aqueous solution to form the dielectric layer 2, which has a predetermined thickness, on the outer surface of the anode body 1. This covers the entire outer surface of the anode body 1 with the dielectric layer 2, which is formed by valve metal oxides.

Step 3: Chemical polymerization is performed to form the pre-coat layer (not shown) on the surface of the dielectric layer 2. The chemical polymerization for forming the pre-coat layer may be oxidative polymerization, which polymerizes monomer with an oxidant. Then, electrolytic polymerization is performed to form the first conductive polymer layer 3a on the surface of the formed pre-coat layer, and electrolytic polymerization is further performed to form the second conductive polymer layer 3b on the first conductive polymer layer 3a. Specifically, during electrolytic polymerization, the anode body 1, which is covered by the pre-coat layer, and an external cathode are immersed in an electrolytic solution containing monomer and electrolyte. The pre-coat layer, which serves as an anode, and the external cathode are electrically connected to perform electrolytic polymerization and sequentially form the first conductive polymer layer 3a and the second conductive polymer layer 3b on the pre-coat layer. In this manner, the conductive polymer layer 3, which is a laminated layer of the pre-coat layer, the first conductive polymer layer 3a, and the second conductive polymer layer 3b, is formed on the dielectric layer 2.

Step 4: A surface roughening process is performed by blasting the outermost surface of the conductive polymer layer 3 (second conductive polymer layer 3b) to form ridges and valleys on the outermost surface of the conductive polymer layer 3. Specifically, ridges and valleys are formed on the surface of the conductive polymer layer 3 (second conductive polymer layer 3b) by blasting abrasive grains having a predetermined grain diameter under predetermined conditions (projection distance, blasting pressure, processing time). The material of the abrasive grain may be glass, nylon, polycarbonate, melamine, urea, alumina, calcium carbonate, silica sand, steel, or the like.

Step 5: A conductive carbon paste containing spherical carbon particles is applied to and dried on the outermost surface of the conductive polymer layer 3 to form the conductive carbon layer 4. The conductive carbon layer 4 covers the conductive polymer layer 3. The outermost surface of the conductive carbon layer 4 has ridges and valleys reflecting the ridges and valleys on the surface of the conductive polymer layer 3.

A silver paste mainly containing spherical silver particles is applied to and dried on the outermost surface of the conductive carbon layer 4 to form the first silver paste layer 5a. A silver paste mainly containing silver flakes is then applied to and dried on the first silver paste layer 5a to form the second silver paste layer 5b. The silver paste layer 5 including a laminated layer of the first silver paste layer 5a, which mainly contains spherical silver particles, and the second silver paste layer 5b, which mainly contains silver flakes, is formed on the conductive carbon layer 4. The cathode layer 6 including the conductive carbon layer 4 and the silver paste layer 5 is formed after step 5.

The capacitor element 10 is manufactured by performing steps 1 to 5.

Step 6: A conductive adhesive (not shown) is applied to the plate-shaped cathode terminal 8. The conductive adhesive is dried in a state in which the cathode layer 6 and the cathode terminal 8 are in contact with each other with the conductive adhesive in between. This bonds the cathode layer 6 and the cathode terminal 8. The plate-shaped anode terminal 7 is spot-welded and bonded to the anode lead 1a.

Step 7: A transfer mold process is performed to mold the mold package 9 around the capacitor element 10. The molding is performed so as to accommodate the anode lead 1a, the anode body 1, the dielectric layer 2, the conductive polymer layer 3, and the cathode layer 6 in the mold package 9. Further, the ends of the anode terminal 7 and cathode terminal 8 are exposed from the mold package 9 extending in opposite directions. The mold package 9 is preferably formed from a resin that functions to prevent moisture from moving into and out of the mold package 9 or a resin that functions to prevent cracking and stripping during solder reflow (heating treatment). For example, epoxy resin, which has a small hygroscopic coefficient, may be used.

Step 8: The distal portions of the anode terminal 7 and cathode terminal 8 exposed from the mold package 9 are bent along the side surface and lower surface of the mold package 9. The distal portions of the two terminals function as terminals of the solid electrolytic capacitor and are electrically connected to a substrate by a solder member.

Step 9: Finally, a predetermined voltage is applied to the terminals 7 and 8 to perform an aging process of the solid electrolytic capacitor. This stabilizes the properties of the solid electrolytic capacitor.

The solid electrolytic capacitor of the present embodiment is manufactured through the above steps.

EXAMPLE

Examples and comparative examples for evaluating the properties of the solid electrolytic capacitor in the present embodiment will now be discussed.

Example 1

In example 1, a solid electrolytic capacitor A1 was fabricated through steps 1A to 9A, which respectively corresponds to the above-described steps 1 to 9.

Step 1A: Niobium metal powder having a CV value of 150,000 µF·V/g was prepared. The CV value is the product of the capacitance of the niobium porous sintered body and the electrolysis voltage after the formation of the electrolytic oxidation coating (dielectric layer). Molding was performed with the niobium metal powder so as to embed part of the anode lead 1a therein and then sintered in a vacuum environment at a temperature of approximately 1,200° C. This formed a niobium porous sintered body functioning as the anode body 1. The distal portion of the anode lead 1a was extended out of the anode body 1. The niobium metal particles were fused together during the sintering. Gaps formed between the niobium particles were reduced in size by the sintering. Unless otherwise mentioned, the CV value of the sintered body in each of the following examples and comparative examples is 150,000 µF·V/g.

Step 2A: Anodization was performed on the sintered anode body 1 for ten hours under a constant voltage of about 10 V in a phosphoric acid aqueous solution of about 0.1% by weight at a temperature maintained at about 60° C. This formed the dielectric layer 2 from niobium oxide so as to cover the periphery of the anode body 1.

Step 3A: The anode body 1, the surface on which surface the dielectric layer 2 was formed, was immersed in an oxidant solution and then immersed in a pyrrole monomer solution to polymerize the pyrrole monomer on the dielectric layer 2. This formed the pre-coat layer of polypyrrole on the dielectric layer 2. Subsequently, with the pre-coat layer functioning as the anode, the first conductive polymer layer 3a was formed with a predetermined thickness (e.g., about 75 µm) on the pre-coat layer by performing electrolytic polymerization in the electrolytic solution containing pyrrole monomer and electrolyte. Furthermore, with the pre-coat layer (or first conductive polymer layer 3a) functioning as the anode, the second conductive polymer layer 3b was further formed with a predetermined thickness (e.g., about 25 μm) on the first conductive polymer layer 3a by performing electrolytic polymerization in the electrolytic solution containing pyrrole monomer and electrolyte. This formed the conductive polymer layer 3 including a laminated film of the pre-coat layer, the first conductive polymer layer 3a, and the second conductive polymer layer 3b on the surface of the dielectric layer 2.

Step 4A: Glass abrasive grains having an average grain diameter of 100 μm were blasted under a blasting pressure of 4.0 kg/cm$^2$ (projection distance of 15 cm and processing time of three minutes) against the outermost layer surface of the conductive polymer layer 3 (surface of second conductive polymer layer 3b). The outermost layer surface of the conductive polymer layer 3 (surface of second conductive polymer layer 3b) was then roughened to form ridges and valleys.

Step 5A: The anode body 1, onto which surface the conductive polymer layer 3 and underlying layers have been formed, was immersed in a liquid in which spherical carbon particles having an average particle diameter of 0.05 μm were dispersed. The anode body 1 was then dried for 10 minutes at a temperature of 90° C. This formed the conductive carbon layer 4 containing spherical carbon particles with a thickness of about 1.1 μm so as to cover the ridges and valleys on the surface of the conductive polymer layer 3.

The silver paste containing silver particles having an average particle diameter of 0.6 μm was then applied to the conductive carbon layer 4, dried for thirty minutes at a temperature of 65° C., and then further dried for forty minutes at a temperature of 160° C. This formed the first silver paste layer 5a containing spherical silver particles with a thickness of about 5.8 μm on the conductive carbon layer 4.

The silver paste containing silver flakes (main component) and spherical silver particles was applied to the first silver paste layer 5a, and dried for thirty minutes at a temperature of 65° C., and then dried for forty minutes at a temperature of 160° C. This formed the second silver paste layer 5b containing silver flakes (main component) and spherical silver particles with a thickness of about 42 μm on the first silver paste layer 5a. Silver particles having an average size of 12.0 μm×12.0 μm×0.8 μm were used as the silver flakes, and silver particles having an average particle diameter of 0.6 μm, with is the same as the first silver paste, were used as the spherical silver particles. The mixing ratio of the silver flakes and the spherical silver particles was 9:1 in ratio by weight. The average particle diameter of the spherical silver particles can be measured as follows. First, the particle diameter of each of arbitrarily-selected spherical silver particles, for example approximately 100 of spherical silver particles is measured. The measurement can be performed via a scanning electron microscope (SEM). The average value of the measured particle diameters is calculated to obtain the average particle diameter of the spherical silver particles. The average particle size of the silver flakes can be measured as follows. First, the lengthwise dimension, the widthwise dimension and the thickness of each of arbitrarily-selected silver flakes, for example approximately 100 of silver flakes, is measured. The measurement can be performed via a scanning electron microscope (SEM). The average values of the lengthwise dimension, the widthwise dimension and the thickness are calculated to obtain the average particle size of the silver flakes.

In this manner, the silver paste layer 5 including the first silver paste layer 5a, which mainly contains spherical silver particles, and the second silver paste layer 5b, which mainly contains silver flakes, was formed on the conductive carbon layer 4, which contains spherical carbon particles. The conductive carbon layer 4 and the silver paste layer 5 on the conductive polymer layer 3 form the cathode layer 6.

The capacitor element 10 was manufactured through the above-described steps 1A to 5A.

Step 6A: Conductive adhesive including silver paste was applied to the cathode terminal 8 and then dried in a state in which the cathode layer 6 and the cathode terminal 8 were in contact with each other with the conductive adhesive in between. This connects the cathode layer 6 and the cathode terminal 8 via the conductive adhesive (not shown).

Furthermore, the anode terminal 7 was spot-welded onto the anode lead 1a. Specifically, current was applied to the distal portion of the anode lead 1a in a state in which the anode lead 1a and the anode terminal 7 were held under a pressurized state between two welding electrodes so as to fuse and bond together the anode lead 1a and the anode terminal 7 with the resistance heat. This connected the anode lead 1a and the anode terminal 7.

Step 7A: The transfer process was performed for molding. Specifically, the capacitor element 10 was arranged in a mold (between upper and lower molds), and epoxy resin was pressurized and injected into the mold in a heated and softened state. After completely filling the gap between the capacitor element 10 and the mold, this state was continuously maintained under a high temperature for a certain time to cure the epoxy resin. As a result, the mold package 9 having a substantially rectangular solid shape was formed from epoxy resin around the capacitor element 10. The mold package 9 accommodates the anode lead 1a, the anode body 1, the dielectric layer 2, the conductive polymer layer 3, and the cathode layer 6, and the ends of the anode terminal 7 and the cathode terminal 8 are extended out of the mold package 9 in opposite directions. The epoxy resin used for the mold package is a resin composition of biphenyl epoxy resin, a flame retardant (brominated epoxy resin/antimony trioxide), an imidazole curing agent, 1% by weight of a flexibilizing agent (silicone), and 82% by weight of a filler agent (molten silica). Such epoxy resin was adjusted such that the minimum viscosity was less than or equal to 60 Pa·s when softened. The molding conditions were, for example, a mold temperature of 175° C., a holding time (pre-heating time) for the epoxy resin before injection of 10 seconds, a holding time (curing time) after injection of 90 seconds, and an injection pressure for the epoxy resin of 7 MPa.

Step 8A: The distal portions of the anode terminal 7 and the cathode terminal 8 exposed from the mold package 9 were bent downward along the side surface and the lower surface of the mold package 9.

Step 9A: Finally, the aging process, a voltage of 4 V was applied to the two terminals (anode terminal 7 and cathode terminal 8) of the solid electrolytic capacitor for two hours.

In this manner, the solid electrolytic capacitor A1 of example 1 was fabricated.

Comparative Example 1

In comparative example 1, a solid electrolytic capacitor X was fabricated in the same manner as in example 1 except in that, in step 5A, a second silver paste layer 5b containing silver flakes (main component) and spherical silver particles was directly formed on the conductive carbon layer 4 without forming the first silver paste layer 5a, which contains spherical silver particles.

Comparative Example 2

In comparative example 2, a solid electrolytic capacitor Y was fabricated in the same manner as in example 1 except in that step 4A was not carried out.

Comparative Example 3

In comparative example 3, a solid electrolytic capacitor Z was fabricated in the same manner as in example 1 except in that step 4A was not carried out and in that, in step 5A, a second silver paste layer 5b containing silver flakes (main component) and spherical silver particles was directly formed on the conductive carbon layer 4 without forming the first silver paste layer 5a, which contains spherical silver particles.

Evaluation

First, the properties of each solid electrolytic capacitor fabricated in example 1 and comparative examples 1 to 3 were evaluated. In the property evaluation, the equivalent series resistance (equivalent series resistance of the solid electrolytic capacitor at a frequency of 100 kHz) was measured with an LCR meter in an initial state (before a reflow process), after the reflow process, and after a high temperature load test. In the reflow process, heating process was performed for ten seconds at a temperature of 260° C. on the solid electrolytic capacitor. In the high temperature load test, a voltage of 2.5 V was further applied for 500 hours at a temperature of 105° C. after the reflow process.

An arithmetic average roughness Ra was then calculated for the surface of the conductive polymer layer in each solid electrolytic capacitor fabricated in example 1 and comparative examples 1 to 3 to evaluate the irregular state of the surface. The arithmetic average roughness Ra is an average value obtained by extracting only a reference length in a direction of an average line from a roughness curve, adding the absolute values of deviations from the average line of the extracted portion to the measurement curve, and calculating the average. See JIS B0601.

In this evaluation, each sample after the high temperature load test is cut vertically to the anode lead 1a at the middle of the anode body 1. After polishing the cut surface, the roughness curve of the conductive polymer layer 3 was obtained from an optical microscope image of the cut surface. The arithmetic average roughness was calculated from the roughness curve of 100 μm at the middle of the two long sides of each rectangular cross-section, and the two obtained arithmetic average roughness was averaged to obtain the arithmetic average roughness Ra (see FIG. 1(B)) at the surface of the conductive polymer layer 3.

Table 1 shows the evaluation results of the arithmetic average roughness and the equivalent series resistance of the solid electrolytic capacitors of the example and the comparative examples. In table 1, the value of the equivalent series resistance of each example is the average of the measurement values for ten samples.

TABLE 1

| | Solid Electrolytic Capacitor | Ave. Grain Diameter of Abrasive Grains (μm) | Blasting Pressure (kg/cm²) | Arithmetic Average Roughness (μm) | Silver Paste Layer Structure | Equivalent Series Resistance (mΩ) | | |
|---|---|---|---|---|---|---|---|---|
| | | | | | | Initial | After Reflow | After High Temp. Load Test |
| Exp 1 | A1 | 100 | 4.0 | 2.03 | Dual Layer | 8.1 | 9.0 | 10.2 |
| Comp. Exp 1 | X | 100 | 4.0 | 2.03 | Single Layer | 10.1 | 12.6 | 17.3 |
| Comp. Exp 2 | Y | — | — | 0.06 | Dual Layer | 10.6 | 16.2 | 30.8 |
| Comp. Exp 3 | Z | — | — | 0.06 | Single Layer | 10.5 | 16.0 | 30.6 |

As shown in table 1, if ridges and valleys are not formed on the surface of the conductive polymer layer 3 through the blasting process, comparison between comparative example 2 (solid electrolytic capacitor Y) in which the silver paste layer 5 has a dual layer structure and comparative example 3 (solid electrolytic capacitor Z) having a single layer structure shows that the equivalent series resistances (initial state, after reflow process, after high temperature load test) are about the same. Thus, it can be assumed that the silver paste layer 5 has conductive properties that are about the same regardless of the layer structure (dual layers, single layer).

In comparative example 1 (solid electrolytic capacitor X), it is apparent that the equivalent series resistance in the initial state is only slightly reduced with respect to comparative example 3 (solid electrolytic capacitor Z). This is assumed to be due to the reason that although the ridges and valleys are formed on the surface of the conductive polymer layer 3 through the blasting process, a resistance reduction effect, which results from an increase in the area of contact between the conductive polymer layer 3 and the conductive carbon layer 4, is weakened by a resistance increase, which results from a decrease in the area of contact between the conductive carbon layer 4 and the silver paste layer 5.

In example 1 (solid electrolytic capacitor A1), it is apparent that the initial equivalent series resistance is further reduced from comparative example 1 (solid electrolytic capacitor X). It is assumed that the initial equivalent series resistance is reduced for the following reason. In example 1 (solid electrolytic capacitor A1), the first silver paste layer 5a, which contains spherical silver particles, enters the ridges and valleys in the surface of the conductive carbon layer 4 that reflect the surface state of the conductive polymer layer 3. This increases the area of contact between the conductive carbon layer 4 and the first silver paste layer 5a and between the first silver paste layer 5a and the second silver paste layer 5b. Thus, the contact resistance between the cathode layer 6 formed by these layers and the conductive polymer layer 3 is reduced.

Further, in example 1 (solid electrolytic capacitor A1), it is apparent that, compared with comparative example 1 (solid electrolytic capacitor X), an increase in the equivalent series resistance after the reflow process and after the high temperature load test is suppressed, and the heat resistance reliability is enhanced. It is assumed that an increase in the equivalent series resistance is suppressed and that the heat resistance reliability is enhanced for the next reason. The adhesion strength between the conductive polymer layer 3 and the conductive carbon layer 4 is increased by the anchor effect resulting from the formation of the ridges and valleys on the surface of the conductive polymer layer 3. In addition, the first silver paste layer 5a, which contains spherical silver particles, enters the ridges and valleys of the surface of the conductive carbon layer 4 that reflect the surface state of the conductive polymer layer 3. This also increases the adhesion strength between the conductive carbon layer 4 and the first silver paste layer 5a and between the first silver paste layer 5a and the second silver paste layer 5b due to the anchor effect. Thus, stripping (e.g., stripping at the interface of the conductive polymer layer 3 and the cathode layer 6) caused by the reflow process and the high temperature load test is suppressed.

As described above, an effective way to reduce the equivalent series resistance of the initial state and improve the heat resistance reliability in the solid electrolytic capacitor in which ridges and valleys are formed at the surface of the conductive polymer layer 3 would be to form the silver paste layer 5 of the cathode layer 6 as a laminated structure including the first silver paste layer 5a, which mainly contains spherical silver particles, and the second silver paste layer 5b, which mainly contains silver flakes on the first silver paste layer 5a.

Next, the influence of the irregular state (arithmetic average roughness Ra) of the surface at the conductive polymer layer 3 was evaluated.

Examples 2 to 4

In examples 2 to 4, solid electrolytic capacitors A2 to A4 were fabricated in the same manner as in example 1 except in that glass abrasive grains having an average grain diameter of 80 μm were blasted under a blasting pressure of 0.3 kg/cm$^2$, 0.6 kg/cm$^2$, and 1.0 kg/cm$^2$ (projection distance 15 cm, processing time three minutes) in step 4A.

Examples 5 to 9

In examples 5 to 9, solid electrolytic capacitors A5 to A9 were fabricated in the same manner as in example 1 except in that glass abrasive grains having an average grain diameter of 100 μm were blasted under a blasting pressure of 0.6 kg/cm$^2$, 1.0 kg/cm$^2$, 1.5 kg/cm$^2$, 2.5 kg/cm$^2$ and 5.0 kg/cm$^2$ (projection distance 15 cm, processing time three minutes) in step 4A.

Examples 10 to 12

In examples 10 to 12, solid electrolytic capacitors A10 to A12 were fabricated in the same manner as in example 1 except in that glass abrasive grains having an average grain diameter of 200 μm were blasted under a blasting pressure of 3.0 kg/cm$^2$, 4.0 kg/cm$^2$, and 5.0 kg/cm$^2$ (projection distance 15 cm, processing time three minutes) in step 4A.

Evaluation

In the same manner as in example 1, the equivalent series resistance in the initial state, after reflow process, and after high temperature load test, and the irregular state (arithmetic average roughness) of the surface of the conductive polymer layer 3 were evaluated for each solid electrolytic capacitor fabricated in examples 2 to 12.

Table 2 shows the evaluation results of the arithmetic average roughness Ra of the surface of the conductive polymer layer 3 and the equivalent series resistance of each solid electrolytic capacitor. The value of the equivalent series resistance in the table is the average of ten measured samples.

TABLE 2

| | Solid Electrolytic Capacitor | Average Grain Diameter of Abrasive Grains (μm) | Blasting Pressure (kg/cm$^2$) | Arithmetic Average Roughness Ra (μm) | Silver Paste Layer Structure | Equivalent Series Resistance (mΩ) | | |
|---|---|---|---|---|---|---|---|---|
| | | | | | | Initial | After Reflow | After High Temp. Load Test |
| Exp. 2 | A2 | 80 | 0.3 | 0.11 | Dual Layer | 10.3 | 14.3 | 23.9 |
| Exp. 3 | A3 | 80 | 0.6 | 0.21 | Dual Layer | 9.2 | 11.8 | 21.7 |
| Exp. 4 | A4 | 80 | 1.0 | 0.29 | Dual Layer | 9.0 | 10.7 | 11.6 |
| Exp. 5 | A5 | 100 | 0.6 | 0.37 | Dual Layer | 8.5 | 9.3 | 10.1 |
| Exp. 6 | A6 | 100 | 1.0 | 0.48 | Dual Layer | 7.0 | 8.3 | 8.9 |
| Exp. 7 | A7 | 100 | 1.5 | 0.72 | Dual Layer | 6.7 | 8.5 | 8.7 |
| Exp. 8 | A8 | 100 | 2.5 | 1.09 | Dual Layer | 6.9 | 8.2 | 8.8 |
| Exp. 1 | A1 | 100 | 4.0 | 2.03 | Dual Layer | 8.1 | 9.0 | 10.2 |
| Exp. 9 | A9 | 100 | 5.0 | 3.14 | Dual Layer | 8.4 | 9.8 | 10.4 |
| Exp. 10 | A10 | 200 | 3.0 | 4.19 | Dual Layer | 8.7 | 10.5 | 11.9 |
| Exp. 11 | A11 | 200 | 4.0 | 4.98 | Dual Layer | 9.1 | 11.3 | 12.7 |
| Exp. 12 | A12 | 200 | 5.0 | 6.44 | Dual Layer | 10.5 | 13.1 | 21.0 |
| Comp. Exp. 2 | Y | — | — | 0.06 | Dual Layer | 10.6 | 16.2 | 30.8 |

As shown in table 2, it is apparent that in comparison with comparative example 2 (solid electrolytic capacitor Y), each equivalent series resistance is reduced in examples 1 to 12 (solid electrolytic capacitors A1 to A12) in which ridges and valleys are formed on the surface of the conductive polymer layer 3 through the blasting process. Furthermore, in these examples, each equivalent series resistance can be further reduced when the arithmetic average roughness Ra of the surface of the conductive polymer layer 3 is in the range of 0.3 μm to 5.0 μm. It is assumed that the equivalent series resistance is reduced for the next reason. When the arithmetic average roughness Ra is less than 0.3 μm, it becomes difficult for the first silver paste layer 5a, which contains spherical silver particles having an average particle diameter of 0.6 μm, to enter the ridges and valleys in the surface of the conductive carbon layer 4 that reflect the surface state of the conductive polymer layer 3. Thus, the area of contact between the conductive carbon layer 4 and the first silver paste layer 5a does not increase, and the reduction effect of the contact resistance and the enhancement effect of the adhesion strength cannot be sufficiently obtained. When the arithmetic average roughness Ra is greater than 5 μm, the area of contact between the conductive polymer layer 3 and the cathode layer 6 (conductive carbon layer 4) is not sufficiently increased by the ridges and valleys in the surface of the conductive polymer layer 3.

Further, in examples 6, 7, and 8 in which the average particle diameter (0.6 μm) of the spherical silver particles forming the first silver paste layer 5a is approximately 0.5 to 1.3 times compared to the arithmetic average roughness Ra of the surface of the conductive polymer layer 3, each equivalent series resistance was reduced among the above-described range in which the arithmetic average roughness is 0.3 to 5.0 μm. In a case in which the average particle diameter of the spherical silver particles forming the first silver paste layer 5a is approximately 0.5 to 1.3 times compared to the arithmetic average roughness Ra of the surface of the conductive polymer layer 3, the values of the arithmetic average roughness Ra of the surface of the conductive polymer layer 3 and the average particle diameter of the spherical silver particles forming the first silver paste layer 5a are nearly the same. This increases the area of contact between the conductive carbon layer 4 and the first silver paste layer 5a and thereby reduced the contact resistance. Thus, the equivalent series resistance can be further reduced.

When the average particle diameter of the spherical silver particles forming the first silver paste layer 5a is approximately 0.5 to 1.3 times compared to the arithmetic average roughness Ra of the surface of the conductive polymer layer 3, the quantity of spherical silver particles in the first silver paste layer 5a that enter the ridges and valleys in the surface of the conductive polymer layer 3 to fill the ridges and valleys can be decreased. Thus, when the average particle diameter of the spherical silver particles forming the first silver paste layer 5a is approximately 0.5 to 1.3 times compared to the arithmetic average roughness Ra of the surface of the conductive polymer layer 3, the contact resistance between the spherical silver particles of the first silver paste layer 5a is reduced. Accordingly, electrical resistance is reduced from the conductive carbon layer 4 to the silver flakes in the second silver paste layer 5b. This reduces the equivalent series resistance.

The solid electrolytic capacitor of the present embodiment has the advantages described below.

(1) In the solid electrolytic capacitor having ridges and valleys in the surface of the conductive polymer layer 3, the silver paste layer 5 of the cathode layer 6 has a laminated structure formed by the first silver paste layer 5a, which mainly contains spherical silver particles, and the second silver paste layer 5b, which mainly contains silver flakes on the first silver paste layer 5a. This obtains a solid electrolytic capacitor with reduced equivalent series resistance.

(2) In the solid electrolytic capacitor having ridges and valleys in the surface of the conductive polymer layer 3, the silver paste layer 5 in the cathode layer 6 has a laminated structure formed by the first silver paste layer 5a, which mainly contains spherical silver particles, and the second silver paste layer 5b, which mainly contains silver flakes on the first silver paste layer 5a. This obtains a solid electrolytic capacitor with enhanced heat resistance reliability.

(3) By using the second silver paste layer 5b, which mainly contains silver flakes, the silver flakes come into contact with one another and easily form a conductive path. This reduces the resistance of the entire silver paste layer 5. This obtains a solid electrolytic capacitor in which the equivalent series resistance is further reduced.

(4) It is preferable that a layer mainly containing spherical carbon particles be used as the conductive carbon layer 4. This arranges the first silver paste layer 5a containing spherical silver particles between the carbon particles and increases the area of contact between the conductive carbon layer 4 and the silver paste layer 5a. Thus, the contact resistance between the conductive carbon layer 4 and the first silver paste layer 5a is further reduced. This obtains a solid electrolytic capacitor in which the equivalent series resistance is further reduced.

(5) When forming ridges and valleys on the surface of the conductive polymer layer 3 through the blasting process, the arithmetic average surface Ra of the surface of the conductive polymer layer 3 is preferably in the range of 0.3 μm to 5.0 μm. Thus, advantages (1) to (4) can be further appreciated.

It should be apparent to those skilled in the art that the present invention may be embodied in many other specific forms without departing from the spirit or scope of the invention. Particularly, it should be understood that the present invention may be embodied in the following forms.

In the above-described embodiment, a porous sintered body formed from valve metal particles is used as the anode body. However, the present invention is not limited in such a manner. For example, a foil of a valve metal may be used as an anode foil. In this case, the same advantages as the above-described embodiment are obtained.

In the above-described embodiment, the conductive polymer layer has a three-layer structure (pre-coat layer, first conductive polymer layer, second conductive polymer layer), and ridges and valleys are formed in the surface (outermost layer surface) of the conductive polymer layer. However, the present invention is not limited in such a manner. For example, the conductive polymer layer may have a structure formed by a single layer, two layers, or four layers, or more layers, and the ridges and valleys may be formed in the surface (outermost layer surface) of such structure. In such cases, the same advantages as the above-described embodiment are obtained.

In the above-described embodiment, the surface roughening process is performed by carrying out the blasting process on the surface of the conductive polymer layer. However, the present invention is not limited in such a manner. For example, a surface roughening process may be performed by using a wrapping film. This also obtains the same advantages as the above-described embodiment.

The present examples and embodiments are to be considered as illustrative and not restrictive, and the invention is not to be limited to the details given herein, but may be modified within the scope and equivalence of the appended claims.

What is claimed is:
1. A solid electrolytic capacitor comprising:
   an anode body;
   a dielectric layer arranged on a surface of the anode body;
   a conductive polymer layer arranged on the dielectric layer; and
   a cathode layer including a carbon layer arranged on the conductive polymer layer and a silver layer arranged on the carbon layer;

wherein the conductive polymer layer includes ridges and valleys formed in a surface that faces toward the cathode layer; and the silver layer includes a first silver layer, which is arranged on the carbon layer covering the ridges and valleys of the conductive polymer layer and which mainly contains spherical silver particles, and a second silver layer, which is arranged on the first silver layer and which mainly contains silver flakes.

2. The solid electrolytic capacitor according to claim 1, wherein the carbon layer mainly contains spherical carbon particles.

3. The solid electrolytic capacitor according to claim 1, wherein the surface of the conductive polymer layer including the ridges and valleys has an arithmetic average roughness in a range of 0.3 μm to 5.0 μm.

4. The solid electrolytic capacitor according to claim 3, wherein the spherical silver particles have an average particle diameter of 0.6 μm.

5. The solid electrolytic capacitor according to claim 1, wherein the spherical silver particles are smaller than the silver flakes.

6. The solid electrolytic capacitor according to claim 1, wherein the spherical silver particles forming the first silver paste layer have an average particle diameter that is 0.5 to 1.3 times compared to the arithmetic average roughness of the surface of the conductive polymer layer in which the ridges and valleys are formed.

7. A method for manufacturing a solid electrolytic capacitor, the method comprising:
   preparing an anode body;
   arranging a dielectric layer on a surface of the anode body;
   arranging a conductive polymer layer on the dielectric layer;
   arranging a carbon layer on the conductive polymer layer; and
   arranging a silver layer on the carbon layer;

wherein said arranging the conductive polymer layer includes forming ridges and valleys in a surface of the conductive polymer layer by performing a blasting process using abrasive grains having a predetermined grain diameter;

said arranging the carbon layer includes covering the ridges and valleys of the conductive polymer layer with the carbon layer; and said arranging the silver layer includes arranging a first silver layer mainly containing spherical silver particles on the carbon layer and arranging a second silver layer mainly containing silver flakes on the first silver layer.

8. The manufacturing method according to claim 7, wherein the carbon layer mainly contains spherical carbon particles.

9. The manufacturing method according to claim 7, wherein said forming ridges and valleys in the surface of the conductive polymer layer includes controlling an arithmetic average roughness of the surface having the ridges and valleys in a range of 0.3 μm to 5.0 μm.

10. The manufacturing method according to claim 9, wherein the spherical silver particles have an average particle diameter of 0.6 μm.

11. The manufacturing method according to claim 7, wherein the spherical silver particles are smaller than the silver flakes.

12. The manufacturing method according to claim 7, wherein the spherical silver particles have an average particle diameter, and the abrasive grains have an average grain diameter that is greater than the average particle diameter of the spherical silver particles.

13. The manufacturing method according to claim 7, wherein the spherical silver particles forming the first silver paste layer have an average particle diameter that is 0.5 to 1.3 times compared to the arithmetic average roughness of the surface of the conductive polymer layer in which the ridges and valleys are formed.

* * * * *